(12) United States Patent
Kalamatianos et al.

(10) Patent No.: US 8,909,866 B2
(45) Date of Patent: Dec. 9, 2014

(54) PREFETCHING TO A CACHE BASED ON BUFFER FULLNESS

(71) Applicants: John Kalamatianos, Arlington, MA (US); Ravindra Nath Bhargava, Austin, TX (US); Ramkumar Jayaseelan, Austin, TX (US)

(72) Inventors: John Kalamatianos, Arlington, MA (US); Ravindra Nath Bhargava, Austin, TX (US); Ramkumar Jayaseelan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 221 days.

(21) Appl. No.: 13/669,502

(22) Filed: Nov. 6, 2012

(65) Prior Publication Data

US 2014/0129772 A1 May 8, 2014

(51) Int. Cl.
*G06F 12/08* (2006.01)
(52) U.S. Cl.
CPC ........ *G06F 12/0862* (2013.01); *G06F 12/0897* (2013.01)
USPC ................... 711/119; 711/137; 711/E12.024; 711/E12.057
(58) Field of Classification Search
CPC .......................... G06F 12/0862; G06F 12/0897
USPC .................................................. 711/119, 137
See application file for complete search history.

(56) References Cited

U.S. PATENT DOCUMENTS

| 6,212,603 | B1 | 4/2001 | McInerney et al. |
| 6,571,318 | B1 | 5/2003 | Sander et al. |
| 7,840,761 | B2* | 11/2010 | Colavin et al. ................ 711/137 |
| 2009/0037663 | A1* | 2/2009 | Hondou ........................ 711/137 |
| 2010/0306477 | A1* | 12/2010 | Luttrell ......................... 711/137 |
| 2012/0054448 | A1 | 3/2012 | Thompson et al. |

OTHER PUBLICATIONS

International Search Report and Written Opinion correlating to PCT/US13/068433 dated Mar. 3, 2014, 9 pages.

* cited by examiner

*Primary Examiner* — Aracelis Ruiz (57) ABSTRACT

A processor transfers prefetch requests from their targeted cache to another cache in a memory hierarchy based on a fullness of a miss address buffer (MAB) or based on confidence levels of the prefetch requests. Each cache in the memory hierarchy is assigned a number of slots at the MAB. In response to determining the fullness of the slots assigned to a cache is above a threshold when a prefetch request to the cache is received, the processor transfers the prefetch request to the next lower level cache in the memory hierarchy. In response, the data targeted by the access request is prefetched to the next lower level cache in the memory hierarchy, and is therefore available for subsequent provision to the cache. In addition, the processor can transfer a prefetch request to lower level caches based on a confidence level of a prefetch request.

21 Claims, 5 Drawing Sheets

PREFETCHING TO A CACHE BASED ON BUFFER FULLNESS

BACKGROUND

1. Field of the Disclosure

The present disclosure generally relates to processors and, more particularly, to prefetching at a processor.

2. Description of the Related Art

Processor architectures typically employ a memory hierarchy having external memory at the lowest level of the memory hierarchy and a cache at each higher level of the memory hierarchy. The processor architectures further employ a processor core that requests data (instructions or operand data) from the highest level cache in the memory hierarchy. In response to determining that information responsive to an access request is not stored at a particular cache in the memory hierarchy, the cache will issue an access request for the information from the cache at the next lower level in hierarchy. Some processor architectures employ non-blocking caches, whereby the caches are able to service access requests while awaiting the satisfaction of pending access requests to lower levels in the memory hierarchy. Such architectures can use a miss address buffer (MAB) to store address and other information for each pending access request. Each cache in the memory hierarchy is assigned slots of the MAB, such that the number of slots assigned to a cache governs the maximum permissible number of pending access requests for the cache.

Access requests can be of at least two types: demand requests, representing a request from the processor core for either instructions or data known to be needed by the processor; and prefetch requests that speculatively request instructions or data expected to be responsive to instructions or data references predicted to be executed at a later point. Demand requests are typically given greater priority for reservation of storage locations at the MAB. This prioritization can negatively impact prefetching due to lack of available storage locations at the MAB, thereby reducing processor efficiency.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate techniques for improving processing efficiency by transferring prefetch requests from their targeted cache to another cache in a memory hierarchy based on a fullness of a miss address buffer NAB) or based on confidence levels of the prefetch requests. A processor maintains the MAB such that each slot at the MAB can store information related to upending access request for a cache in the memory hierarchy. Each cache in the memory hierarchy is assigned a set of slots at the MAB. In response to determining the fullness of the set of slots assigned to a cache is above a threshold when a prefetch request to the cache is received, the processor transfers the prefetch request to the next lower level cache in the memory hierarchy. In response, the data targeted by the access request is prefetched to a lower level cache in the memory hierarchy, and is therefore available for provision to the cache in the event of a subsequent demand request. In addition, the processor can transfer a prefetch request to tower level caches based on a confidence level of a prefetch request. This ensures that prefetch requests associated with a low confidence level do not consume a higher-level cache's slots at the MAB, which would be used for either demand requests or prefetch requests having a higher confidence.

Figure 1:
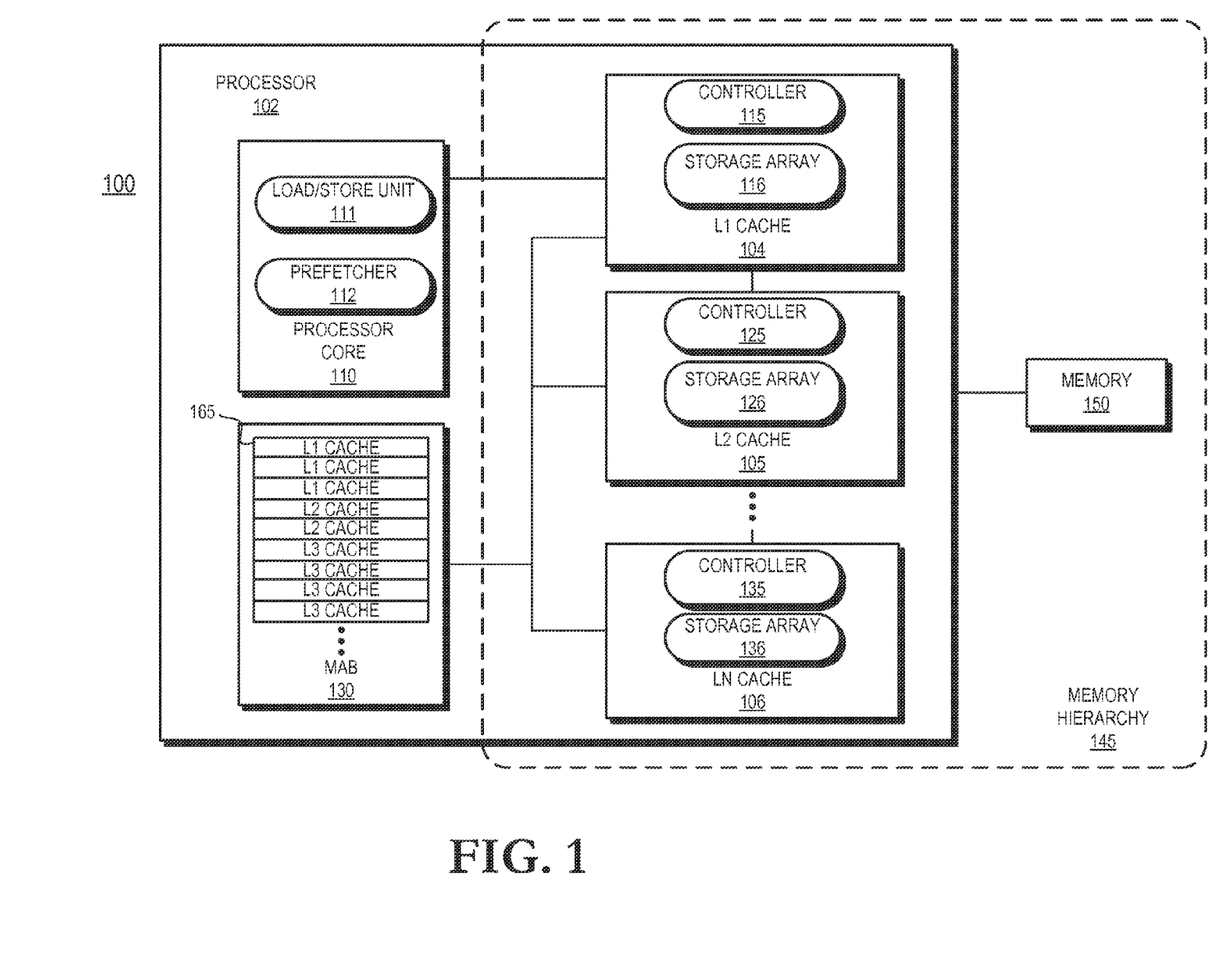
FIG. 1 is a block diagram of an electronic device in accordance with some embodiments.

FIG. 1 illustrates an electronic device 100 having a processor 102 and a memory 150 in accordance with some embodiments. The electronic device 100 can be any device that employs a processor, including a personal computer, server, portable electronic device such as a cell phone, automotive device, game console, and the like. The processor 102 is generally configured to execute sets of instructions arranged as computer programs and stored at the memory 150. The sets of instructions manipulate the processor 102 in order to carry out tasks associated with the computer programs.

The processor 102 includes a processor core 110 that executes the sets of instructions. In some embodiments, the processor core 110 implements an instruction pipeline having a plurality of stages, whereby each stage carries out particular operations as part of an instruction's execution. For example, the instruction pipeline can include a fetch stage to fetch the next instruction in a program order, a decode stage to decode fetched instructions into sets of micro-operations, a dispatch stage to dispatch the micro-operations for execution, an execution stage having a plurality of execution units to execute the dispatched micro-operations, and a retire stage to manage retirement of instructions.

The processor 102 also includes a set of N caches, where N is an integer. In the illustrated example, the N caches include a cache 104, a cache 105, and additional caches through an Nth cache 106. For purposes of discussion, it is assumed that the caches 104-106 store data that is manipulated by the processor 102 during execution of instructions. The processor 102 can also include another set of caches arranged in a hierarchy that stores the instructions to be executed by the processor core 110. In some embodiments one or more of the caches 104-106 can store both instructions and data. Although the techniques described with respect to FIG. 1 will be described under the assumption that the caches 104-106 store data, it will be appreciated that the techniques also apply to caches that store instructions.

The caches 104-106 and the memory 150 together form a memory hierarchy 145 for the electronic device 100. The memory 150 is located at the lowest level of the memory hierarchy 145, and the caches 104-106 are each located at a different corresponding level of the memory hierarchy 145. Thus in the illustrated example of FIG. 1, the cache 104 is located at the highest level of the hierarchy, and is therefore referred to as the L1 ("level 1") cache 104. The cache 105 is located at the next higher level in the memory hierarchy 145, and is referred to as the L2 ("level 2") cache 105. The other caches of the processor 102 are located at other levels of the memory hierarchy 145, with the cache 106 at the Nth level and referred to as LN cache 106. In some embodiments, each successively higher level of the memory hierarchy 145 is successively smaller (has a smaller capacity to store data). Thus, for example, the L1 cache 104 capacity is smaller than the capacity of the L2 cache 105. However, as described further below, the processor 102 typically stores and retrieves data from the memory hierarchy 145 via the L1 cache 104 and does not directly store or retrieve data from other levels of the memory hierarchy 145. Accordingly, data located at lower levels of the memory hierarchy 145 is provided to the processor 102 by having the data traverse each level of the memory hierarchy 145 until it reaches the L1 cache 104. Each level the data traverses in the memory hierarchy 145 introduces additional latency in responding to an access request from the processor 102. Accordingly, the higher the level of the memory hierarchy 145 in which data requested by the processor 102 is located, the higher the processing efficiency for the data (and the lower the latency for the processor 102 receiving the data).

Each of the caches 104-106 includes a controller and a storage array. The storage array for each of the caches 104-106 is a set of storage elements, such as bitcells, configured to store data. The controller for each of the caches 104-106 is configure to manage the storage and retrieval of data at its corresponding storage array. In the illustrated example, the L1 cache 104 includes the controller 115 and the storage array 116, the L2 cache 105 includes the controller 125 and the storage array 126, and the LN cache 106 includes the controller 135 and the storage array 136.

The processor core 110 includes a load/store unit 111 to generate memory access requests in response to particular instructions. To illustrate, in some embodiments the toad/store unit 111 is located at the execution stage of an instruction pipeline of the processor core 110. A decode stage of the instruction pipeline decodes the particular instructions to generate operations to retrieve data from the memory hierarchy 145 (load operations) or to store data at the memory hierarchy 145 (store operations). The load and store operations are collectively referred to herein as memory access requests. Each memory access request includes a memory address identifying a location of the data accessed by the memory access request.

In response to a memory access request, the load/store unit 111 generates a request, referred to herein as a demand request, to the memory hierarchy 145. The demand request is provided to the L1 cache 104. The controller 115 analyzes the memory address for the demand request and determines if the storage array 116 stores the data associated with the memory address. If so, the controller 115 satisfies the demand request by providing the data associated with the memory address to the load/store unit 111 if the demand request is for a load operation or by storing new data at the location corresponding to the memory address if the demand request is a store operation. If the controller 115 determines that the storage array 116 does no store data associated with the memory address, it indicates a cache miss and provides the demand request to the L2 cache 105.

In response to the demand request, the controller 125 analyzes the memory address for the demand request and determines if the storage array 126 stores the data associated with the memory address. If so, the controller 125 provides the data to L1 cache 104 for storage at the storage array 116. The controller 115 then satisfies the demand request using the data stored at the storage array 116. If the controller 125 determines that the storage array 126 does not store data associated with the memory address, it indicates a cache miss and provides the demand request to the cache at the next lower level of the memory hierarchy 145. The controllers at other levels of the memory hierarchy 145 perform similar operations to the controller 125 to determine if their corresponding storage array stores the data associated with the memory address. If so, they provide the data to the cache at the next higher level in the hierarchy, which in turn provides it to the next higher level cache, and so on until the data is provided to the controller 115 for storage at the storage array 116. If a cache does not store the data associated with the memory address it indicates a cache miss provides the demand request to the cache at the next higher level. The demand request thus traverses the memory hierarchy 145 until the data is determined to be located at a cache or until it reaches the LN cache 106. If the controller 135 determines that the storage array 136 does not store the data associated with the memory address, it provides the memory address to the memory 150. In response, the memory 150 provides the data to the controller 135 for traversal up the memory hierarchy 145 to the L1 cache 104.

In some embodiments each of the caches 104-106 stores data provided from the cache at the next higher level in response to a demand request. Lower level caches in general have a higher capacity (e.g. more storage cells) than higher level caches and therefore can store more data. In some embodiments, the controllers of the caches 104-106 can implement different policies, whereby a cache may provide data to the next higher level without storing the data at its storage array. For example, each demand request can include a field indicating a type of the demand request, such as a priority level, and the controllers of the caches 104-106 can determine, based on the priority level of a demand request, which of the storage arrays is to store the data responsive to the demand request.

The processor core 110 includes a prefetcher 112 that analyzes the demand requests issued by the load/store unit 111 and issues prefetch requests for data based on the analysis. Prefetch requests are similar to demand requests, but are generated as a speculative operation based on data expected to be requested by instructions executed at the processor core 110 at a later point. A prefetch request, as described further herein, causes the data targeted by the prefetch request to be moved up the memory hierarchy 145. Accordingly, if the data is requested as expected, the data is closer in the hierarchy to the processor core 110, thereby reducing access latency.

Prefetch requests are provided to the L1 cache 104 and can be satisfied by the memory hierarchy 145 in similar fashion as demand requests. To illustrate, each prefetch request includes a memory address indicating the memory location of the data targeted by the prefetch request. The prefetch request can traverse the memory hierarchy 145 in similar fashion as demand requests, whereby the data targeted by the prefetch request is transferred up the hierarchy until it is stored at the L1 cache 104. As described further below, for some prefetch requests, the data targeted by the prefetch request is not transferred all the way to the L1 cache, but is only transferred to a lower level of the memory hierarchy 145, such as the L2 cache 105. This allows the processor 102 to more efficiently manage the satisfaction of demand requests when cache resources are scarce, as described further herein.

A demand request or a prefetch request is referred to as "pending" with respect to a cache if that cache is awaiting a response to the demand request or (prefetch request from the next lower level cache in the hierarchy. Thus, for example, if the L1 cache 104 is awaiting the L2 cache 105 to provide data in response to a demand request, the demand request is referred to as pending at the L1 cache. It will be appreciated that ugh/on demand request or prefetch requests can be pending at more than one of the caches 104-106 depending on where the data responsive to the demand request is located in the memory hierarchy 145. The caches 104-106 are configured as non-blocking caches in that each of the caches 104-106 can perform other operations, including responding to other demand requests or prefetch requests, while there are demand requests or prefetch requests pending at the cache.

To implement the non-blocking attribute of the caches 104-106, the processor 102 includes a missed address buffer (MAB) 130. The MAB 130 includes a plurality of slots, such as slot 165, whereby each slot can store information representing a corresponding demand request or prefetch request pending at one of the caches 104-106. The processor 102 assigns each of the caches 104-106 a corresponding set of the slots at the MAB 130, such that a cache can only store information for upending demand request or a pending prefetch request at one of its assigned slots. In the illustrated example of FIG. 1, each slot is labeled with the corresponding cache to which it is assigned.

To illustrate, in response to determining a cache miss at a cache of the memory hierarchy 145, the cache's controller finds any available slots in its assigned set to store the information for the demand request or prefetch request that caused the cache miss. A slot is determined to be available if it does not store information for another demand request or prefetch request that is pending at the cache. The cache controller stores information for the demand request that caused the cache miss at the available slot. Once the last available slot assigned to a cache at the MAB 130 has been filled with information for a demand request or prefetch request, the cache indicates to the cache at the next higher level of the memory hierarchy 145 that it cannot accept additional demand requests or prefetch requests. In response to data responsive to a pending demand or prefetch request being provided to a cache, the cache's controller makes the corresponding slot at the MAB 130 available, and indicates to the next higher level of the memory hierarchy 145 that it can accept additional demand requests or prefetch requests.

In some cases, allowing a cache's assigned slots at the MAB 130 to be used by too high a number of pending prefetch requests can reduce processing efficiency at the processor core 110. For example, in some cases processing efficiency is enhanced if satisfaction of demand requests is given a higher priority at the caches 104-106 than satisfaction of a prefetch request. Accordingly, the caches 104-106 can manage the MAB 130 to increase the likelihood that a slot will be available to store information for a pending demand request. For example, in some embodiments the controller 115 for L1 cache 104 monitors the fullness of the slots available at the MAB 130 assigned to the cache 104. If the fullness of the slots is lower than a threshold value, the controller 115 implements a policy whereby prefetch requests received at the L1 cache 104 are transferred to the L2 cache 105. In response to transferring a prefetch request, the controller 115 does not store the information representing the prefetch request at one of its assigned slots at the MAB 130. A higher number of available slots are thereby reserved for received demand requests, enhancing processing efficiency.

As used herein, the fullness of a set of slots at a buffer refers to any parameter that identifies or otherwise represents a number of demand requests stored at the set, a number of prefetch requests stored at the set, or a combination thereof. The fullness of the set of slots can be determined in a number of ways. For example, the fullness can be determined by subtracting the number of available slots of a set of slots from the total number of slots in the set. In some embodiments the fullness is equal to or based on the number of slots of the set that store information representing (prefetch requests. In some embodiments the fullness is equal to or based on a difference between the number of slots of the set that store information representing demand requests and the number of slots of the set that store information representing prefetch requests. In some embodiments the fullness is equal to or based on a ratio of slots storing prefetch request information to slots storing demand request information.

In response to receiving a transferred prefetch request, the L2 cache 105 processes the transferred prefetch request similarly to a non-transferred prefetch request, but does not provide data responsive to the transferred prefetch request to the L1 cache 104. To illustrate, in response to receiving a transferred prefetch request, the L2 cache 105 determines if the storage array 126 stores data associated with the memory address of the prefetch request. If so, it does not provide the data to the L1 cache 104, but maintains it at the storage array 126. If the storage array 126 does not store the data associated with the prefetch request memory address, the controller 125 stores the information representing the prefetch request at the MAB 130. In addition, the controller 125 provides the prefetch request to the cache at the next lower level in the hierarchy. In response, the L2 cache 105 eventually receives the data associated with the prefetch request memory address from a lower level in the memory hierarchy 145. The controller 125 stores the received data at the storage array 126, but does not provide it to the L1 cache 104. The data targeted by the prefetch request is thus moved closer in the memory hierarchy 145 to the processor core 110, thereby reducing latency if the data is later the subject of a demand request. However, the prefetch data is not provided all the way to the L1 cache 104, providing more room at the L1 cache 104 for satisfaction of demand requests.

In some embodiments, a prefetch request can continue to be transferred down the memory hierarchy 145 until it reaches a cache that has greater than a threshold level of available slots at the MAB 130. For example, if the L2 cache 105 receives a transferred prefetch request, the controller 125 can determine if it has more than the threshold level of available slots at the MAB 130. If not, it can transfer the prefetch request to the cache. Different caches in the memory hierarchy 145 can transfer prefetch requests based on different threshold numbers of available slots.

In some embodiments, the caches 104-106 can transfer prefetch requests based on a confidence level of the prefetch requests. In particular, each prefetch request can have a confidence value indicating the predicted likelihood that the data targeted by the prefetch request will be requested by the processor core 110 within a threshold amount of time. In response to the confidence level for a prefetch request being below a threshold, a cache can transfer the prefetch request to the next lower level cache in the memory hierarchy 145. This ensures that prefetched data that is predicted to be less likely to be requested does not consume space at higher levels of the memory hierarchy 145. In some embodiments, the caches 104-106 can transfer prefetch requests based on a combination of the confidence level of the prefetch requests and the fullness of the caches' corresponding slots at the MAB 130.

For example, the cache 104 can a transfer prefetch requests in response to its slots at the MAB 130 being more than 50% full and a confidence level of the prefetch request being lower than 40%, and can transfer the prefetch request in response to the MAB being more than 35% full and the confidence level of the prefetch request being lower than 60%.

Figure 2:
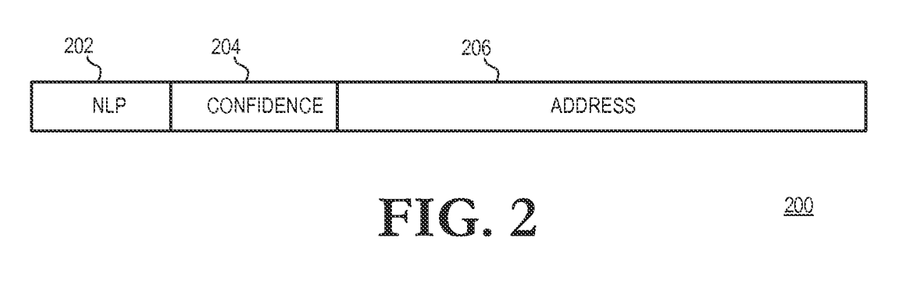
FIG. 2 is a block diagram of prefetch request information used at a processor of the electronic device of FIG. 1 in accordance with some embodiments.

FIG. 2 illustrates a block diagram of prefetch information 200 representing a prefetch request in accordance with some embodiments. The prefetch information 200 includes a next level prefetch (NLP) field 202, a confidence field 204, and an address field 206. The address field 206 indicates the memory address of the data targeted by the prefetch request represented by the prefetch information 200. The NLP field 202 indicates whether the prefetch request is to be transferred to a different cache in the memory hierarchy 145 (FIG. 1). The NLP field is used by the cache controllers to determine whether a (prefetch request has been transferred and to therefore determine whether to transfer the data responsive to the prefetch request to the next higher level cache in the memory hierarchy 145. To illustrate, in response to receiving a prefetch request, the controller 125 of the L2 cache 105 (FIG. 1) determines whether the NLP field 202 of the prefetch request indicates the prefetch request has been transferred. If not, the L2 cache 105 provides data responsive to the prefetch request (whether retrieved from the storage array 126 or received from another cache in the memory hierarchy 145) to the L1 cache 104. If the NLP field 202 indicates the prefetch request is a transferred prefetch request, the L2 cache 105 stores the data responsive to the prefetch request at the storage array 126, but does not provide the data to the L1 cache 104 responsive to the prefetch request. The NLP field 202 of a prefetch request is set to indicate the request is a transfer by the controller 115 in response to determining the slots assigned to the L1 cache 104 exceed a threshold fullness.

The confidence field 204 of the prefetch information 200 indicates the confidence level of the associated prefetch request. The value of the confidence field 204 is set by the prefetcher 112 when it issues the prefetch request. The prefetcher 112 sets the value of the confidence field 204 based on the pattern of demand accesses issued by the load/store unit 111. To illustrate, in some embodiments the prefetcher 112 sets a confidence level for a particular pattern to an initial value in response to detecting that pattern a first time. The prefetcher 122 increases the confidence level each time it detects the pattern again, up to a maximum value, and reduces the confidence level each time it detects a part of the pattern but detects that not all of the pattern was followed. For example, the prefetcher 122 can detect that a demand request (referred to as "demand request A") tier data at memory address A is followed closely by a demand request for data at memory address B (referred to as "demand request B"). In response, the prefetcher 122 sets a confidence level for the access pattern (referred to as pattern A-B) to an initial value of 001. In response to detecting another instance of the pattern A-B, the prefetcher 122 increases the confidence level to 010. The prefetcher 122 continues to increase the confidence level in response to detecting further instances of the pattern A-B. However, in response to detecting demand request A and detecting that the demand request A is not closely followed by demand request B, the prefetcher 122 reduces the confidence level.

In response to the confidence level for an access pattern exceeding a threshold, the prefetcher 112 issues a prefetch request for the data targeted by the next demand request in the pattern. Thus, in the above example, once the confidence level for pattern A-B exceeds the threshold level, the prefetcher 122 issues a prefetch request for the data at memory address B in response to detecting an instance of demand request A. For the prefetch request, the prefetcher 122 sets the confidence field 204 to the current confidence level associated with the access pattern. Thus, if the confidence level for the pattern A-B is 011, the prefetcher will set the confidence field 204 to the value 011.

The controllers of the memory hierarchy 145 can use the value of the confidence field 204 to determine whether to transfer a prefetch request. To illustrate, the controller 115 at the L1 cache 104 can implement a policy whereby any prefetch request associated with a confidence value of less than 011 is to be transferred to the L2 cache 105. Accordingly, in response to receiving a prefetch request having a confidence field 204 with a value less than 011, the controller 115 sets the NIP field 202 of the prefetch information 200 to indicate the prefetch request is transferred, and provides the prefetch request to the controller 125 at the L2 cache 105.

Figure 3:
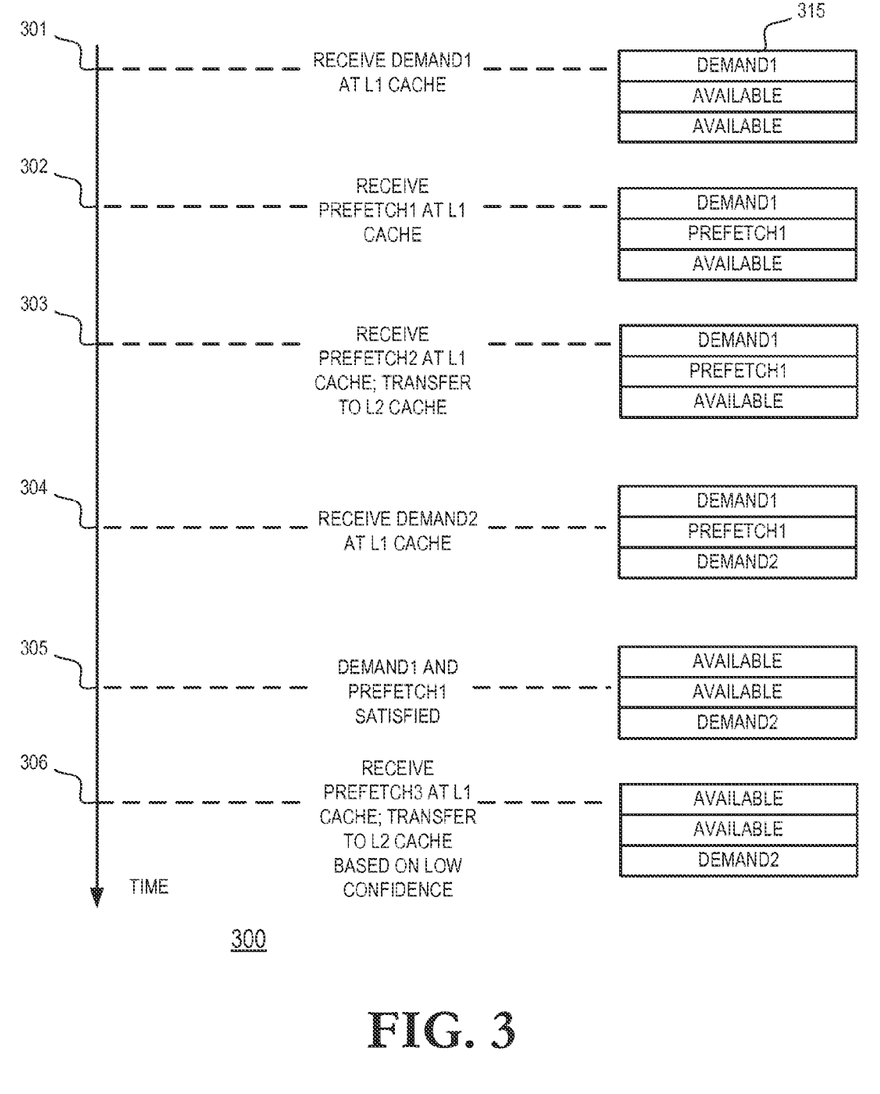
FIG. 3 is a diagram of a timeline illustrating the transfer of prefetch requests at a memory hierarchy of the processor of FIG. 1 in accordance with some embodiments.

FIG. 3 is a diagram of a timeline 300 illustrating the transfer of prefetch requests at the memory hierarchy 145 of the processor 102 of FIG. 1 in accordance with some embodiments. The timeline 300 illustrates a set of events and the resulting contents of a set 315 of slots assigned to the L1 cache 104 at the MAB 130. For purposes of the example of FIG. 1, it is assumed that the controller 115 of the L1 cache 104 implements a policy whereby a prefetch request is transferred to the L2 cache 105 if the number of available slots of the set 315 is less than two.

At time 301 the controller 115 receives a demand request, designated "Demand1," from the load/store unit 111. In response, the controller 115 detects a cache miss and therefore stores information representing Demand1 at the set 315 of slots at the MAB 130. At time 302 the controller 115 receives a prefetch request, designated "Prefetch1," from the prefetcher 112 and determines that Prefetch 1 results in a cache miss. In response to the cache miss the controller 115 determines that the number of slots of the set 315 is equal to two, and therefore stores information representing Prefetch 1 at the set 315.

At time 303 the controller 115 receives a prefetch request, designated "Prefetch2," from the prefetcher 112 and determines that Prefetch 2 results in a cache miss. In response to the cache miss the controller 115 determines that the number of slots of the set 315 is less than two. Accordingly, the controller 115 transfers Prefetch 2 by setting the NLP field (FIG. 2) for Prefetch 2 to indicate a transferred request and provides Prefetch2 to the L2 cache 105. At time 304 the controller 115 receives a demand request, designated "Demand2," from the load/store unit 111. In response, the controller 115 detects a cache miss and therefore stores information representing Demand2 at the set 315 of slots. Thus, if Prefetch 2 had not been transferred, the last slot of the set 315 would have been filled by Prefetch 2, thereby either forcing the load/store unit 111 to stall Demand2 or to cancel either of the prefetch requests Prefetch1 or Prefetch2. Accordingly, by transferring Prefetch2, space is available at the set 315 for Demand2, preventing a stall, and the data responsive to Prefetch2 is moved closer to the processor 102 in the memory hierarchy.

At time 305 the controller 115 determines that Demand1 and Prefetch1 have been satisfied in that the data targeted by these requests has been stored at the storage array 116. In response, the controller 115 removes the information from Demand1 and Prefetch1 from the set 315 of slots, making their two slots available for subsequent demand or prefetch requests. At time 306 the controller 115 receives a prefetch request, designated "Prefetch3," from the prefetcher 112 and determines that Prefetch 3 results in a cache miss. In response to the cache miss the controller 115 determines that the number of slots of the set 315 is two, so that there is space available at the set 315 to store information representing Prefetch3. However, the controller 115 determines that the confidence level for Prefetch 3 is below a threshold value. Accordingly, the controller 115 transfers Prefetch 3 by setting the NLP field for Prefetch 3 to indicate a transferred request and provides Prefetch2 to the L2 cache 105. The controller 115 thus does not consume an available slot at the set 315 with a prefetch request having a low confidence value. The slot is therefore available for subsequent demand requests or prefetch requests that are predicted to better enhance processing efficiency.

Figure 4:
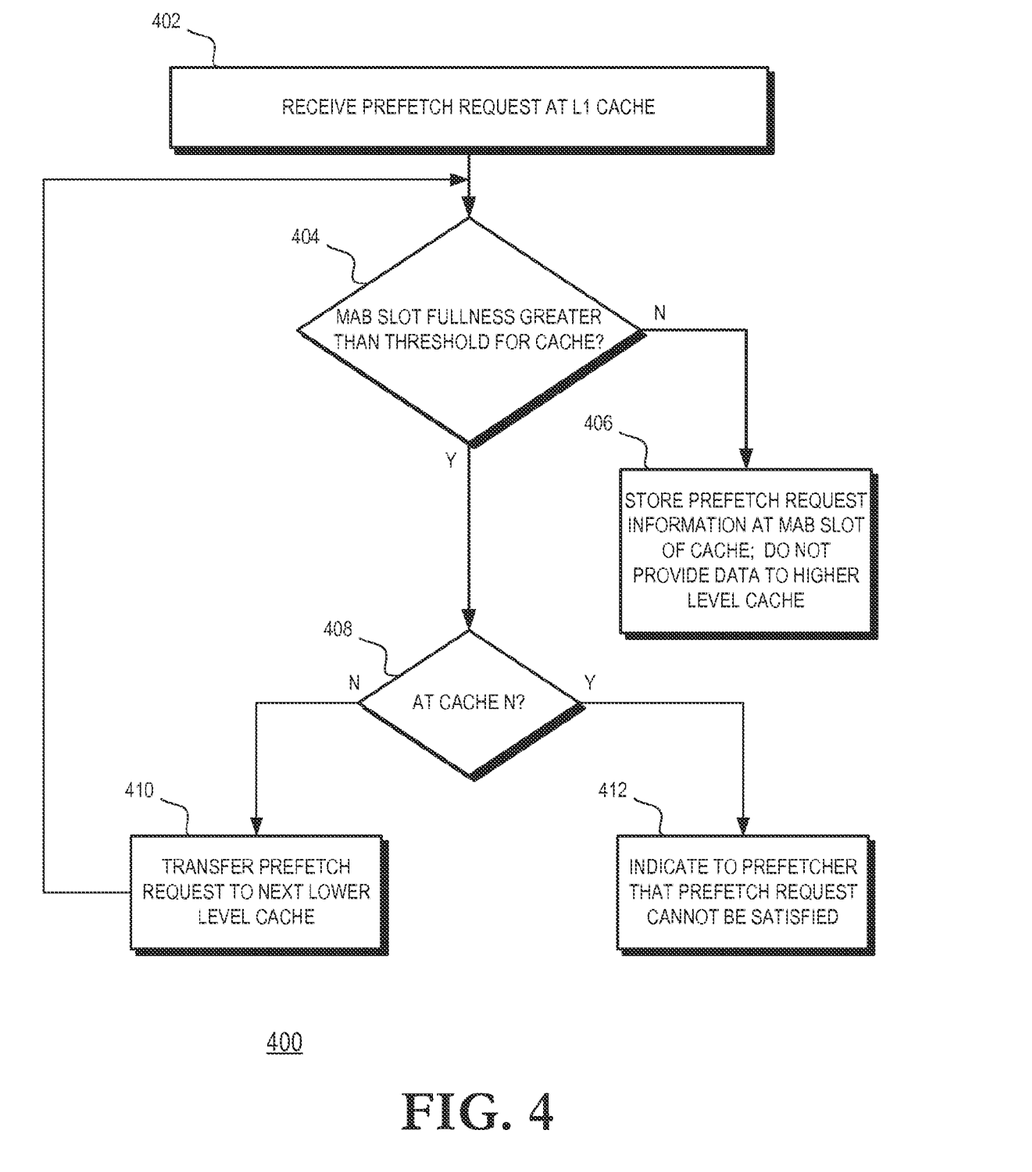
FIG. 4 is a flow diagram of a method of transferring a prefetch request at the memory hierarchy of the processor of FIG. 1 based on the fullness of an MAB in accordance with some embodiments.

FIG. 4 is a flow diagram of a method 400 of transferring a prefetch request at the memory hierarchy based on the fullness of a MAB in accordance with some embodiments. For ease of discussion, the method 400 is described with respect to an example implementation at the electronic device 100 of FIG. 1. At block 402 the controller 115 at the L1 cache 104 receives a prefetch request. At block 404 the controller 115 determines if the fullness of the slots at the MAB 130 assigned to the L1 cache 104 exceeds a threshold for the L1 cache 104. If not, the method flow proceeds to block 406 and the controller 115 stores information representing the prefetch request at an available slot at the MAB 130.

Returning to block 404, if the controller 115 determines that the fullness of the slots at the MAB 130 assigned to the L1 cache 104 does exceed the threshold for the Lit cache 104, the method flow proceeds to block 408, where the controller 115 determines if it is the lowest cache in the memory hierarchy 145. If so, the method flow moves to block 412 and the controller indicates to the prefetcher 122 that the prefetch request cannot be satisfied. Returning to block 408, if cache N has not been reached, the method flow proceeds to block 410 and the controller 115 transfers the prefetch request to the next lower level cache in the memory hierarchy 145—in this case, the L2 cache 105. The method flow returns to block 404, and the next lower level cache in the memory hierarchy deter-mines whether the fullness of its assigned slots at the MAB 130 exceeds a corresponding threshold.

Accordingly, under the method 400, the prefetch request continues to be transferred to lower level caches until it reaches a cache for which the fullness of its assigned slots at the MAB 130 do not exceed a corresponding threshold, or until the method 400 indicates that the prefetch request cannot be satisfied at block 412. If the prefetch request reaches a cache for which the fullness of its assigned slots at the MAB 130 do not exceed a corresponding threshold, the flow of the method 400 will arrive at block 406 and information representing the (prefetch request is stored at a slot of the MAB 130 assigned to the cache. In addition, the controller of the cache ensures that the data targeted by the prefetch request is stored at its corresponding storage array, but is not provided to the next higher level cache in the memory hierarchy 145.

Figure 5:
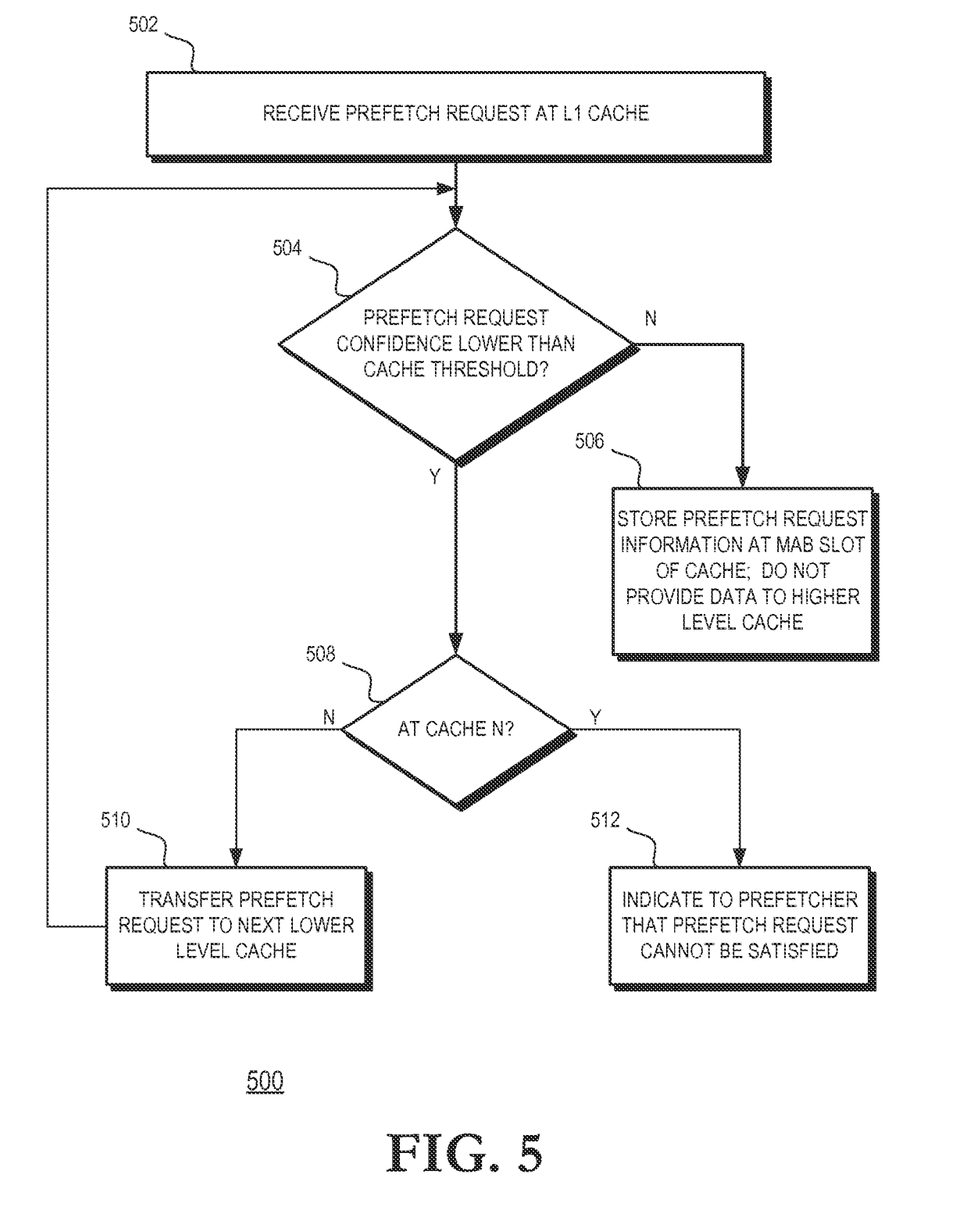
FIG. 5 is a flow diagram of a method of transferring a prefetch request at the memory hierarchy of the processor of FIG. 1 based on a prefetch confidence level in accordance with some embodiments.

FIG. 5 is a flow diagram of a method 500 of transferring a prefetch request at the memory hierarchy of the processor of FIG. 1 based on a prefetch confidence level in accordance with some embodiments. For ease of discussion, the method 500 is described with respect to an example implementation at the electronic device 100 of FIG. 1. At block 502 the controller 115 at the L1 cache 104 receives a prefetch request. At block 504 the controller 115 determines if the confidence level of the prefetch request is lower than a threshold for the L1 cache 104. If not, the method flow proceeds to block 506 and the controller 115 stores information representing the prefetch request at an available slot at the MAB 130.

Returning to block 504, if the controller 115 determines that confidence level of the prefetch request is higher than the threshold for the L1 cache 104, the method flow proceeds to block 508, where the controller 115 determines if it is the lowest cache in the memory hierarchy 145. If so, the method flow moves to block 512 and the controller indicates to the prefetcher 122 that the prefetch request cannot be satisfied. Returning to block 508, if cache N has not been reached, the method flow proceeds to block 510 and the controller 115 transfers the prefetch request to the next lower level cache in the memory hierarchy 145—in this case, the L2 cache 105. The method flow returns to block 504, and the next lower level cache in the memory hierarchy determines whether the confidence level of the prefetch request is lower than a corresponding threshold.

Accordingly, under the method 500, the prefetch request continues to be transferred to lower level caches until it reaches a cache for which the confidence level of the prefetch request exceeds a corresponding threshold, or until the method 500 indicates that the prefetch request cannot be satisfied at block 512. If the prefetch request reaches a cache for the confidence level does not exceed a corresponding threshold, the flow of the method 500 will arrive at block 506 and information representing the prefetch request is stored at a slot of the MAB 130 assigned to the cache. In addition, the controller of the cache ensures that the data targeted by the prefetch request is stored at its corresponding storage array, but is not provided to the next higher level cache in the memory hierarchy 145. It will be appreciated that the methods illustrated at FIGS. 4 and 5 can be combined, such that some prefetch requests are transferred based on the fullness of a cache's assigned slots at the MAB 130 and others are transferred based on their prefetch confidence level.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
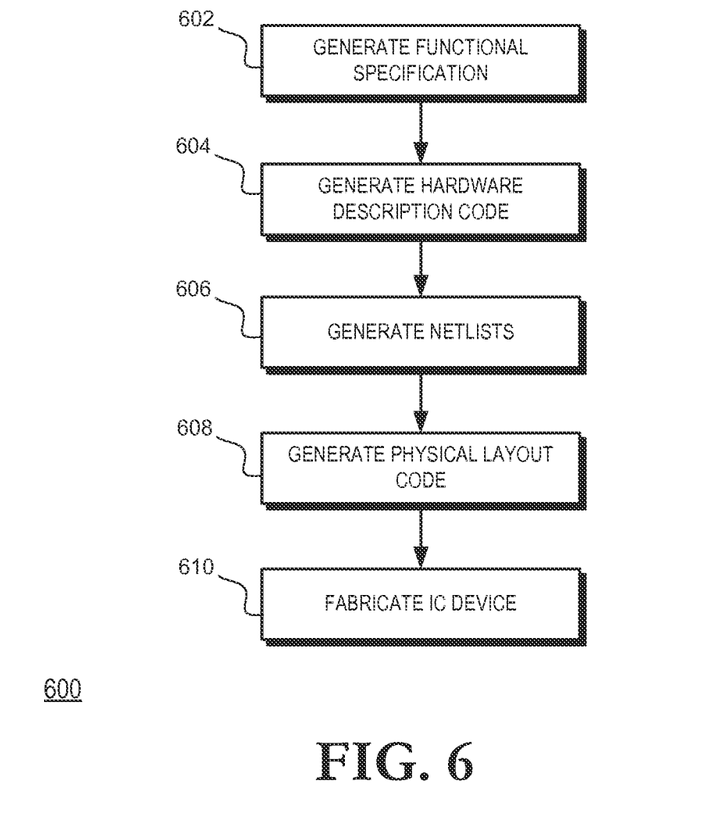
FIG. 6 is a flow diagram illustrating a method for designing and fabricating an integrated circuit device implementing at least a portion of a component of a processor in accordance with some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (FIDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

As disclosed herein, in some embodiments a method includes storing addresses at a first set of slots at a buffer indicative of cache misses at a first cache; and in response to determining a fullness of the first set of slots exceeds a first threshold, transferring a first prefetch request targeted to the first cache to a second cache. In some implementations determining the fullness of the first set of slots includes determining a number of slots at the first set of slots that store addresses associated with pending memory access requests. In some implementations determining the fullness of the first set of slots comprises determining a number of slots of the first set of slots that store prefetch requests. In some implementations determining the fullness of the first set of slots comprises determining a ratio of a number of slots of the first set of slots that store prefetch requests to a number of slots of the first set of slots that store demand requests. In some implementations, the method includes storing addresses at a second set of slots at the buffer in response to cache misses at the second cache. In some implementations, transferring the first prefetch request to the second cache includes storing an address associated with the first prefetch request at the second set of slots. In some implementations, the method includes in response to determining a fullness of the second set of slots exceeds a second threshold, transferring the first prefetch request to a third cache. In some implementations, the first threshold is different than the second threshold. In some implementations, the method includes, in response to determining a confidence level associated with a second prefetch request targeted to the first cache is below a second threshold, transferring the second prefetch request from the first cache to the second cache.

in some embodiments, a method includes in response to determining a first confidence level associated with a first (prefetch request targeted to a first cache is below a first threshold, transferring the first prefetch request from the first cache to a second cache. In some implementations the method includes in response to determining the first confidence level is below a second threshold, transferring the first prefetch request from the second cache to a third cache. In some implementations, transferring the first prefetch request to the second cache comprises storing the first (prefetch request at a first set of slots of a buffer that stores addresses in response to cache misses at the first cache and in response to cache misses at the second cache, the first set of slots assigned to the second cache. In some implementations, the method includes, in response to determining a number of available slots of a second set of slots of the buffer is below a second threshold, transferring a second prefetch request targeted to the first cache to the second cache.

In some embodiments, a processor includes a processor core to issue access requests; a first cache; a second cache; a buffer to store addresses at first set of slots assigned to the first cache based on cache misses to the first cache, the cache misses resulting from access requests; a prefetcher to issue prefetch requests to the first cache; and a controller to transfer a first prefetch request from the first cache to the second cache in response to determining a fullness of the first set of slots at the buffer is above a first threshold. In some implementations, the controller determines the fullness of the first set of slots by determining a number of unavailable slots of the first set of slots. In some implementations, the controller determines the fullness of the first set of slots by determining a number of slots of the first set of slots that store prefetch requests. In some implementations, the controller determines the fullness of the first set of slots by determining a ratio of a number of slots of the first set of slots that store prefetch requests to a number of slots of the first set of slots that store demand requests. In some implementations, the buffer is to store addresses at a second set of slots in response to determining cache misses at the second cache. In some implementations, the controller is to transfer the first prefetch request to the second cache by storing the first prefetch request at the second set of slots. In some implementations the processor includes a third cache; and the controller is to transfer the first prefetch request to the third cache in response to determining a fullness of the second set of slots exceeds a second threshold. In some implementations, the first threshold is different than the second threshold. In some implementations, the prefetcher is to determine a confidence level for a second prefetch request; and the controller is to transfer the second prefetch request from the first cache to the second cache in response to determining the confidence level is below a second threshold.

In some embodiments, a computer readable medium stores code to adapt at least one computer system to perform a portion of a process to fabricate at least part of a processor including: a processor core to issue access requests; a first cache; a second cache; a buffer to store addresses at a first set of slots assigned to the first cache based on cache misses to the first cache in response to the access requests; a prefetcher to issue prefetch requests to the first cache; and a controller to transfer a first prefetch request from the first cache to the second cache in response to determining a fullness of the first set of slots at the buffer is above a first threshold. In some implementations the prefetcher is to determine a confidence level for a second prefetch request; and the controller is to transfer the second prefetch request from the first cache to the second cache in response to determining the confidence level is below a second threshold. In some implementations the controller determines the fullness of the first set of slots by determining a ratio of a number of slots of the first set of slots that store prefetch requests to a number of slots of the first set of slots that store demand requests.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   storing addresses at a first set of slots at a buffer indicative of cache misses at a first cache; and
   in response to determining a fullness of the first set of slots exceeds a first threshold, transferring a first prefetch request targeted to the first cache to a second cache.

2. The method of claim 1, wherein determining the fullness of the first set of slots comprises determining a number of slots at the first set of slots that store addresses associated with pending memory access requests.

3. The method of claim 1, wherein determining the fullness of the first set of slots comprises determining a number of slots of the first set of slots that store prefetch requests.

4. The method of claim 1, wherein determining the fullness of the first set of slots comprises determining a ratio of a number of slots of the first set of slots that store prefetch requests to a number of slots of the first set of slots that store demand requests.

5. The method of claim 1, further comprising:
   storing addresses at a second set of slots at the buffer in response to cache misses at the second cache.

6. The method of claim 5, wherein transferring the first prefetch request to the second cache comprises storing an address associated with the first prefetch request at the second set of slots.

7. The method of claim 5, further comprising:
   in response to determining a fullness of the second set of slots exceeds a second threshold, transferring the first prefetch request to a third cache.

8. The method of claim 7, wherein the first threshold is different than the second threshold.

9. The method of claim 1, further comprising:
   in response to determining a confidence level associated with a second prefetch request targeted to the first cache is below a second threshold, transferring the second prefetch request from the first cache to the second cache.

10. A processor, comprising:
    a processor core to issue access requests;
    a first cache;

a second cache;

a buffer to store addresses at a first set of slots assigned to the first cache based on cache misses to the first cache, the cache misses resulting from access requests;

a prefetcher to issue prefetch requests to the first cache; and a controller to transfer a first prefetch request from the first cache to the second cache in response to determining a fullness of the first set of slots at the buffer is above a first threshold.

11. The processor of claim 10, wherein the controller determines the fullness of the first set of slots by determining a number of unavailable slots of the first set of slots.

12. The processor of claim 10, wherein the controller determines the fullness of the first set of slots by determining a number of slots of the first set of slots that store prefetch requests.

13. The processor of claim 10, wherein the controller determines the fullness of the first set of slots by determining a ratio of a number of slots of the first set of slots that store prefetch requests to a number of slots of the first set of slots that store demand requests.

14. The processor of claim 10, wherein the buffer is to store addresses at a second set of slots in response to determining cache misses at the second cache.

15. The processor of claim 14, wherein the controller is to transfer the first prefetch request to the second cache by storing the first prefetch request at the second set of slots.

16. The processor of claim 15, further comprising:

a third cache; and wherein the controller is to transfer the first prefetch request to the third cache in response to determining a fullness of the second set of slots exceeds a second threshold.

17. The processor of claim 16, wherein the first threshold is different than the second threshold.

18. The processor of claim 10, wherein:

the prefetcher is to determine a confidence level for a second prefetch request; and the controller is to transfer the second prefetch request from the first cache to the second cache in response to determining the confidence level is below a second threshold.

19. A non-transitory computer readable medium code to adapt at least one computer system to perform a portion of a process to fabricate at least part of a processor comprising:

a processor core to issue access requests;

a first cache;

a second cache;

a buffer to store addresses at a first set of slots assigned to the first cache based on cache misses to the first cache in response to the access requests;

a prefetcher to issue prefetch requests to the first cache; and a controller to transfer a first prefetch request from the first cache to the second cache in response to determining a fullness of the first set of slots at the buffer is above a first threshold.

20. The non-transitory computer readable medium of claim 19, wherein:

the prefetcher is to determine a confidence level for a second prefetch request; and the controller is to transfer the second prefetch request from the first cache to the second cache in response to determining the confidence level is below a second threshold.

21. The non-transitory computer readable medium of claim 19, wherein:

wherein the controller determines the fullness of the first set of slots by determining a ratio of a number of slots of the first set of slots that store prefetch requests to a number of slots of the first set of slots that store demand requests.

* * * * *